United States Patent [19]

Goodwin et al.

[11] 4,303,964
[45] Dec. 1, 1981

[54] TAMPER RESISTANT SNAP-FIT STROBE HOUSING

[75] Inventors: Robert A. Goodwin, Braintree; David V. Allen, Malden, both of Mass.

[73] Assignee: Polaroid Corporation, Cambridge, Mass.

[21] Appl. No.: 80,947

[22] Filed: Oct. 1, 1979

[51] Int. Cl.³ .............................................. G03B 15/02
[52] U.S. Cl. ........................................ 362/16; 362/8; 362/374; 362/375
[58] Field of Search ...................... 362/16, 8, 374, 375

[56] References Cited

U.S. PATENT DOCUMENTS 3,763,366  10/1973  Bahnsen ............................... 362/16

Primary Examiner—Stephen J. Lechert, Jr.
Attorney, Agent, or Firm—Leslie J. Payne

[57] ABSTRACT

A snap-fit strobe housing, including mating first and second housing sections with a first latching arrangement carried on the interior of an exterior wall of the first section and a second latching arrangement carried by the second section in position to engage the first latching arrangement to prohibit separation of the sections when such sections are pulled in a given plane generally parallel to the wall. The first latching arrangement is defined by a member extending from the interior of the wall with a portion of the member in overlapping relationship and interiorly of the second latching arrangement. The second latching arrangement engages and latches the overlapping portion whereby such second latching arrangement is retained in continuous engagement with the overlapping portion when the wall is pulled relative to the housing sections at an angle to the given plane.

3 Claims, 6 Drawing Figures

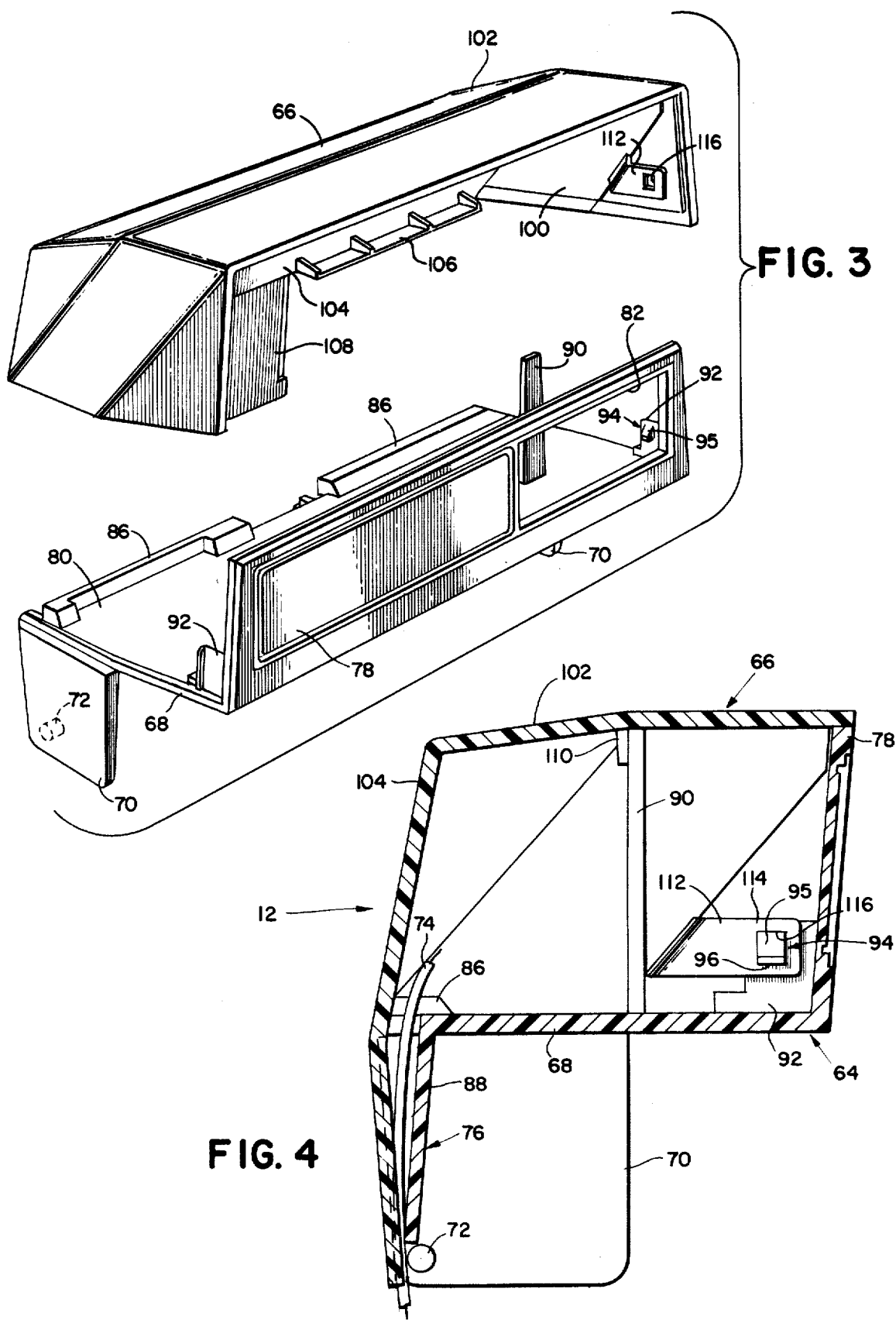

TAMPER RESISTANT SNAP-FIT STROBE HOUSING

BACKGROUND OF THE INVENTION

This invention is related to copending application Ser. No. 81188 concurrently filed herewith and which is assigned in common with the present application.

This invention relates generally to photographic apparatus and, more particularly, to an improved snap-together tamper resistant stroke housing.

In the photographic field, electrically fired strobe units for transient illumination of scenes to be photographed have gained wide acceptance. In use of such strobes, it is necessary to use relatively high amounts of electrical power for achieving the desired illumination intensities required for proper scene lighting. Accordingly, it becomes imperative for safety reasons to provide a housing which suitably electrically insulates the user. Contemporaneous with this requirement are the requirements that the strobe unit be susceptible of convenient manufacture and assembly so as to enable production in a commercially competitive manner.

In regard to the latter requirements, it is known to provide housing components which can be easily assembled together in a snap-fit manner. Exemplary types of snap-fit housings are described in the following U.S. Pat. Nos. 3,346,210; 3,415,599; 3,617,013; 3,620,475; 3,712,557; 3,923,387; 4,015,790; 4,076,186; and 4,079,499. Generally, these housings are comprised of two plastic members having components which are flexible, yet stiff enough to enable a secure snap-fit inter-engagement. While such housings serve reliably, there is a potential for a user effecting snap-fit disengagement by merely laterally spreading or flexing the housing walls which carry the snap-fit components. Thus, although these housings facilitate easy assembly and can provide the necessary electrical insulation, there remains the possibility of a user relatively easily opening the housing. If used for strobes, there is possibility of the user exposing himself to the danger of electrical shock.

Attempts have been made to restrict or minimize disengagement of snap-fit members. One known approach is used in a snap together camera housing utilizing stop members on a first member cooperating with a flexible finger on a second member for restricting longitudinal reciprocation of the latching finger. While the foregoing approach is useful, it still suffers from the drawback that disengagement can be effected if the finger is moved laterally with respect to such longitudinal direction, as by a prying or flexing apart of the first and second members.

A successful approach for overcoming the foregoing problems is embodied in the aforenoted related copending application. As described therein, a snap-fit strobe housing is provided with mating first and second housing sections. Carried by and projecting from the first housing section is a flexible latching finger. A latching arrangement is provided on the interior of an exterior wall of the second housing section for flexing the finger into engagement therewith so as to prevent the housing sections being pulled apart in a given plane generally parallel to the plane of the exterior wall. Also included is retaining structure extending interiorly of the exterior wall in overlapping relationship to a surface of the finger facing away from the interior of the exterior wall so as to engage and retain the latching finger in continuous engagement with the latching arrangement and thereby prevent disengagement of the latching finger from the wall when pulled at an angle to the given plane. The foregoing arrangement serves very satisfactorily. For reasons of economics, less expensive plastics are desirable for strobe housing structure. However, some of the less expensive plastics are more easily flexed and use thereof in the foregoing described strobe housing lead to the potential problem of latching finger disengagement. Such disengagement could occur when the strobe housing end walls are manually gripped and flexed inwardly and then lifted. Consequently, the desired latching action would not be attained.

SUMMARY OF THE INVENTION

To overcome the noted problems and potential for problems in accordance with the present invention, there is provided an improved housing for storing elements forming a photographic flash unit which resists unassisted manual opening.

Briefly described, there is provided, as in prior art housings, a pair of mating first and second housing sections or components for retaining electrical and electronic elements of a photographic flash unit. Carried by the interior of an exterior wall of the first housing section is a first latching arrangement. Carried by the second housing section is a second latching arrangement in a position to engage the first latching arrangement when the sections are mated to thereby prohibit separation of the housing sections when the housing sections are pulled in a given plane generally parallel to the plane of the exterior wall.

In an illustrated emobdiment, the first latching arrangement includes a member extending from the interior of the exterior wall with a portion in overlapping relationship and interiorly of the second latching arrangement. The second latching arrangement is adapted to engage the overlapping portion in a latching arrangement whereby the second latching arrangement is retained in continuous engagement with the overlapping portion when the exterior wall is pulled relative to the housing sections at an angle to the given plane.

In a preferred embodiment, the latching finger has a latching window adjacent the distal end thereof and is made of a material sufficiently flexible to allow limited movement between an initial unflexed and unblocking condition to a flexed and locking condition. The locking means is a detent constructed to selectively flex the finger so that it can move from the unlocking position to a locking position, wherein the detent projects into and cooperates with the latching window.

Among the other objects of the invention are, therefore, the provision of a housing having structure for continuously retaining disengageable locking means in engagement despite the disengageable locking means being pulled in a manner and direction otherwise effecting disengagement; the provision of an easily assemblable snap-fit housing having improved structure for inhibiting separation thereof; and the provision of an improved built-in photographic flash unit housing having structure for facilitating its snap-fit assembly while inhibiting its unassisted manual separation.

Other objects and further scope of applicability of the present invention will become apparent from the detailed description to follow when taken in conjunction with the accompanying drawings in which like parts are designated by like reference numerals.

BRIEF DESCRIPTION OF THE DRAWINGS

FIG. 3 is an exploded perspective of the flash unit housing components;

FIG. 4 is an enlarged fragmented cross-sectional view illustrating cooperation between the locking components of the housing components;

DETAILED DESCRIPTION

Figure 1:
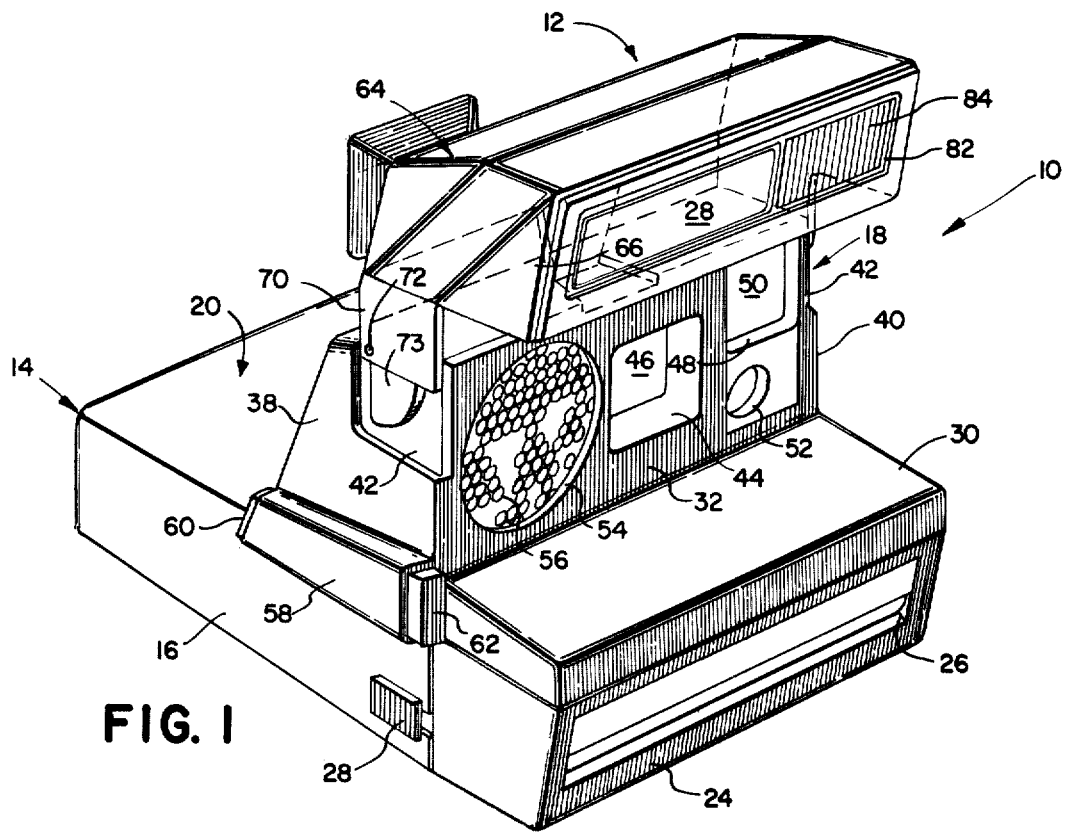
FIG. 1 is a prespective view of a camera having an electronic flash unit embodying the principles of this invention and shown in an extended condition.
Figure 2:
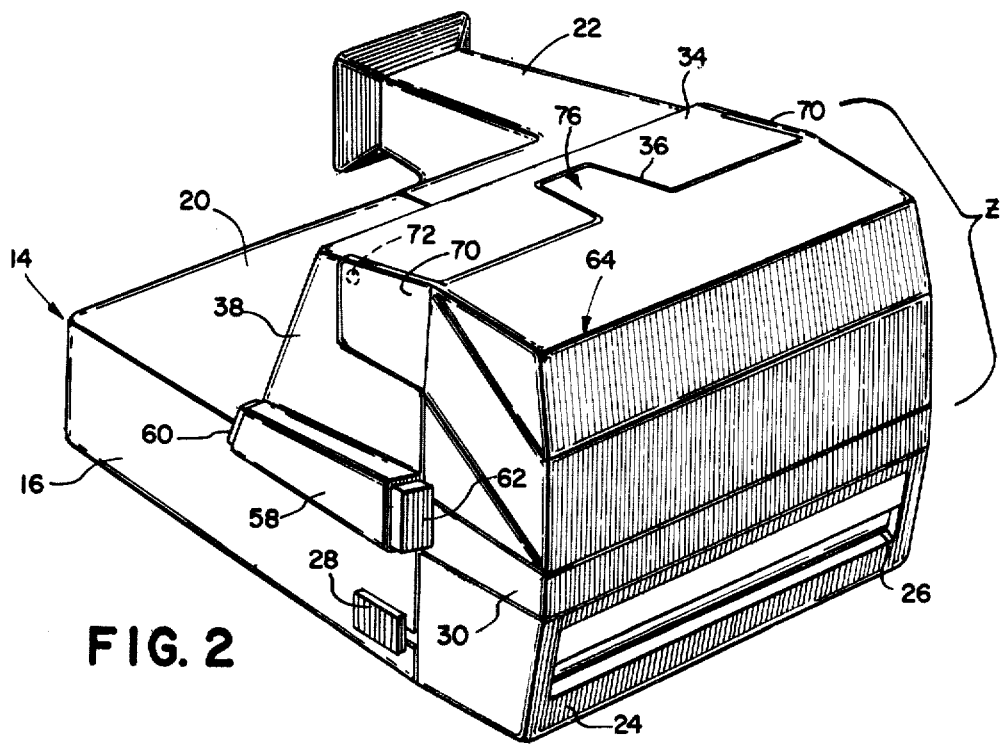
FIG. 2 is a perspective view similar to FIG. 1, but showing the flash unit in a folded condition.

With initial reference to FIGS. 1 and 2, there is shown a compact camera 10 having pivotally attached thereto a foldable flash unit 12 of the electronic strobe type. In the illustrated embodiment, the camera 10 is a compact, highly automated self-developing type utilizing a reflex or folded exposure optical path. Such flash unit 12 is movable between an operative erect position (FIG. 1) and an inoperative folded storage position (FIG. 2). For a more detailed description of the depicted camera 10 and flash unit 12, reference is made to copending application Ser. No. 54,598, filed July 3, 1979; which is assigned in common with the instant application.

In the erect position, the flash unit 12 is positioned for directing its light output into the camera's optical field of view. This provides supplemental transient illumination for facilitating exposure. In the inoperative or storage position, the flash unit 12 is arranged to nest over the forward portion of camera 10. Accordingly, a common protective enclosure for the flash unit 12 and the camera's forward portion is provided.

With continued reference to FIGS. 1 and 2, there is shown a camera housing 14 having a generally parallelepiped base section 16. Upwardly extending from the base section 16 is a forwardly facing housing section 18 housing many of the components associated with exposure control and processing operations. They include a shutter and exposure aperture defining mechanism, and various electronic circuit modules for controlling camera operation. For representative examples of these components and their arrangements, see commonly assigned U.S. Pat. Nos. 3,979,762; 4,040,072; and 4,052,728. Located over the rearward portion of the base section 16 is a section 20 for defining an exposure chamber (not shown). As best illustrated in FIG. 2, the housing section 20 also includes a rearwardly extending viewfinder lens tube 22. The exposure chamber receives a self-developing film pack (not shown) of the type holding a plurality of self-developing film units along with a flat battery for powering the camera's electrical system. A representative example of such a film pack is described generally in commonly assigned U.S. Pat. No. 3,877,045, issued on Apr. 8, 1975, to S. M. Bloom et al.

Pivotally coupled to the forward end of the base section 16 is a film loading door 24 which includes a pair of processing rollers (not shown). In use, the film loading door 24 is normally in the illustrated closed position. As so positioned, the pressure applying rollers are aligned with a film pack film exit slot and an elongated film exit slot 26 formed in a front wall of the loading door 24. This allows for advancement of each of the film units exteriorily of the camera 10. For effecting loading and unloading of the film pack from the exposure chamber, the film loading door 24 is pivoted downwardly to an open position (not shown). This is in part accomplished by movement of a slide latch button 28 from the position shown to an unlatching position (not shown). When in the open position, the film pack can be inserted in or removed from the film pack receiving chamber.

Extending forwardly of the housing section 18 is an apron housing 30 for protectively covering a plurality of internal camera components; not forming a part of this invention.

With specific reference to FIGS. 1 and 2, the housing section 18 includes a lens mounting wall 32; a top wall surface 34 having a central depression 36 for cooperating with the flash unit 12; and a pair of oppositely spaced side wall surfaces 38 and 40 joining the corresponding lateral edges of surfaces 32 and 34 with each side wall having a recessed flash unit mounting section 42. Also, the housing section 18 has a centrally disposed aperture 44 for a variable focus objective or picture-taking lens 46 mounted so that its optical axis is substantially normal to the surface of the lens wall 32. A viewfinder lens aperture 48, aligned with the viewfinder lens tube 22, provides a mounting frame for a Galilean-type viewfinder lens 50. Located below the lens aperture 48 is a photocell aperture 52 for providing optical access to an exposure control photocell (not shown). A transducer aperture 54 is provided for allowing access to an ultrasonic energy transducer 56; the latter forming a part of an automatic lens focusing system of the camera 10. Since such a focusing system, more fully described in commonly assigned U.S. Pat. No. 3,522,764, is considered optional, it may be eliminated without departing from the scope of the invention.

Enclosed by the exposure chamber defining section 20 is an inclined mirror (not shown) for reflecting image forming light passing therethrough downwardly to the camera's focal plane.

A longitudinal actuator mounting tube 58 is integrally formed on the side wall 38. The mounting tube 58 includes a push button type actuator switch 60, for connecting the flash unit 12 to the film pack battery so as to charge the flash unit's electrical storage capacitor. Thereafter, a slider actuator 62, opposite the actuator switch 60, is pushed. This initiates automatic camera operations including film exposure and subsequent film processing.

Referring back to the flash unit 12, it is an electronically-controlled strobe type for providing supplemental, artificial illumination in the camera's field of view for facilitating exposure. Since the structure and operation of the electrical and electronic components of the strobe do not, per se, form an aspect of this invention, a detailed description thereof is not deemed necessary. However, for better understanding of the invention, a brief description of that structure will be presented. Included in the flash unit 12 are various strobe unit components (not shown), for example, a storage capacitor, adapted to be charged from the battery in the film pack and flash control circuits for regulating charging of the capacitor and controlling the application of the stored charge to the flash tube. In a preferred embodiment, flash unit 12 is of the quench type actuatable in time relation to camera shutter operation.

As best shown in FIGS. 3 to 6, the flash unit 12 includes a strobe or flash housing 64, preferably, made of molded plastic. The flash housing 64 includes matable upper and lower housing sections or components 66 and 68 having a plurality of generally planar wall sections. Further included is a pair of pivotal mounting legs 70, each depending from an opposite side of the lower housing component 68. The mounting legs 70 are spaced apart for fitting over and cooperating with the mounting surfaces 42. In this regard, a mounting stub 72 (FIG. 4) is integrally molded on each of the legs 70 and has a snap-fit cooperation with a corresponding mounting hole (not shown) in the mounting section 42 for enabling the noted pivotal movement of the flash unit 12.

For releasably latching the flash unit 12 in both the erect and storage positions, there is provided latching means including a latching cam 73 and stop (not shown) associated with each of the mounting sections 42 and cooperates with cam follower and latch engaging structure (not shown) on each of the interior sides of the mounting legs 70. The flash unit 12 is releasably latched in its storage position (FIG. 2) for providing a compact configuration. In this regard, the flash housing 64 is configured and dimensioned to fit wholly within a storage zone Z. As so positioned, the flash unit 12 provides a protective enclosure for the optical elements on the housing section 18 including the taking lens 46, viewfinder lens 50, the photocell window (not shown) behind the aperture 52, and the ultrasonic transducer 56. Thus, when the flash unit 12 is folded in the manner indicated, it forms a protective enclosure for protecting the exposure control and flash systems from inadvertent damage. To unlatch the flash unit 12 for movement to the erect position (FIG. 1), the process is reversed. That is, the flash housing 64 is grasped by the user and moved upwardly to pivot it in a counterclockwise direction about the mounting posts 73. During such movement, the lower portion of legs 70 flex outwardly and ride over the latching elements (not shown) to assume an erect position wherein the legs return to their unstressed state.

Figure 5:
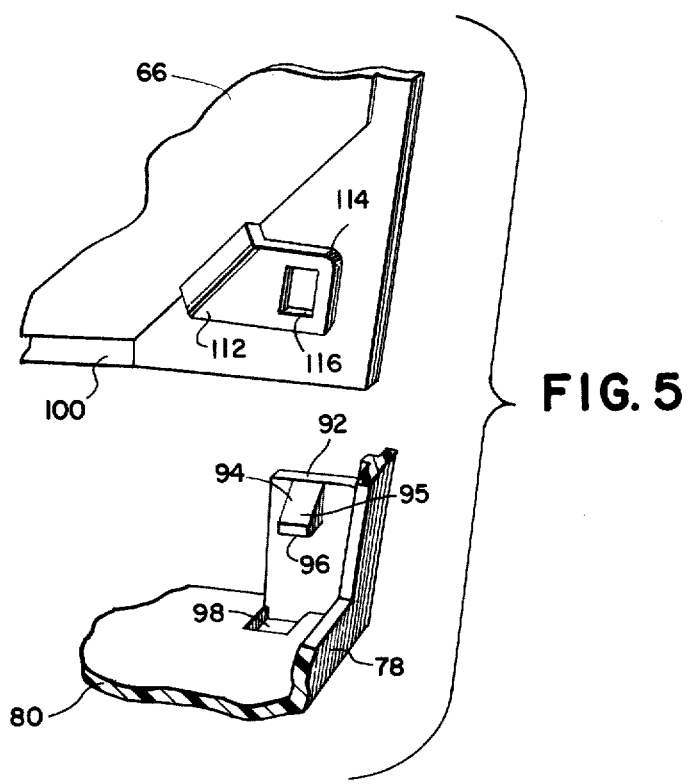
FIG. 5 is an enlarged fragmented perspective view depicting the locking components prior to being assembled.

For electrically coupling the various electrical and electronic components of flash unit 12 to the control circuitry of the camera 10, there is provided a multiple wire flex cable 74 best shown in FIG. 3. The cable 74 exits the housing section 18 and extends through a cable cover 76 (FIG. 5). As best shown in FIG. 1, the cover 76 is adapted to fit into and conform generally to the depression 36.

As shown in FIG. 3, the lower housing compartment 68 includes forward wall 78 and, at right angles thereto, bottom wall 80. The forward wall 78 has a rectangular light aperture 82 allowing the light output of the flash tube (not shown) to pass outwardly through a light window 84 (FIG. 1). In the illustrated embodiment, the light output window 84 includes a plurality of vertically disposed prismatic lens elements for directing the light towards the field of view of the taking lens 46. This occurs, of course, when the flash unit 12 is erect. Extending along the rear edge of the bottom wall 80 is a pair of spaced apart locking ledges 86. Between the locking ledges 86, there is a space allowing passage of the flexible cable 74. Also, it will be observed in FIG. 5 that a protective wall 88 depends between each of the mounting legs 70 and forms part of the cable cover 76.

Additionally, the mounting legs 70 depend from the bottom wall 86 for reasons indicated earlier. Extending upwardly from the bottom wall 86 is a biasing finger 90 for urging a flash tube housing (not shown) into correct positioning relative to the light window 84.

Turning to the latching arrangement of the present invention, it can be seen that along each end of the bottom wall 80, there extends upwardly a latching wall 92 having a latching arrangement or detent 94 with a downwardly sloped camming surface 95 projecting away from the interior surface of the wall and forming a latching shoulder 96 as it extends back to the interior wall surface. Adjacent the interior of each of the latching wall portions 92, an access opening 98 (FIGS. 5 and 6) is formed in the bottom wall 80 for allowing insertion therethrough of a tool (not shown) for effecting disengagement of the latching arrangement in a manner to be described. Also, the latching wall portions 92, as best shown in FIG. 6, are spaced inwardly from the edge of the bottom wall for reasons subsequently apparent.

Now referring to the upper housing component 66, it is, as best shown in FIG. 3, seen to include a pair of opposed end walls 100 interconnected by adjoining pitched top wall 102 and back wall 104. Each of the end walls 100 is arranged to be spaced from the corresponding latching wall portions 92 when in the assembled condition (FIG. 6). A pair of spaced apart locking hook portions 106 (one of which is shown in FIG. 3) is provided on the lower edge of the back wall 104. Each of the hook portions 106 is constructed to fit beneath and to cooperate with the locking ledges 86 (as shown in FIG. 5) for facilitating a tight fit between the matable housing components 66 and 68. A protective wall element 108 depends centrally from the back wall 104 and cooperates with the protective wall 88 to form the cable cover 76. Depending from an interior wall of the top wall 102 is a back stop 110 (FIG. 4) for contacting and laterally supporting the biasing finger 90.

Figure 6:
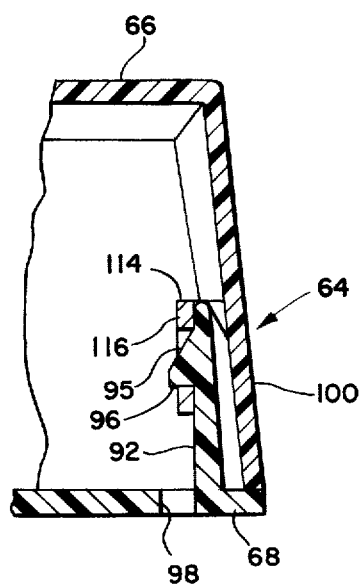
FIG. 6 is an enlarged cross-sectional view of the locking structures of the housing components in the assembled condition.

Carried by and projecting from the interior surface of each of the end walls 100 is a latching arrangement including latching finger 112; only one of which is shown in FIGS. 3–6. Each of the latching fingers 112 initially extend at an angle from the end wall 100 and then generally parallel thereto in spaced apart relationship. As best shown in FIGS. 4 and 6, the distal end 114 of the latching finger 112 is spaced away from the end wall 100 so as to hook around and be in general overlapping relationship with the respective latching detent 94 so as to lockingly cooperate therewith in a manner to be described. Also, each distal end 114 is formed with a rectangular window or opening 116 for cooperating with the latching detent 94. The window 116 provides a releasable engaging means.

The housing section's components 66 and 68 are made of a suitable thermosetting or thermoplastic material which is relatively stiff, but capable of being flexed in a limited manner when subjected to sufficient flexing forces. This material serves additionally to electrically insulate the user. For purposes of illustration and not limitation the flash unit housing 64 is made from an ABS thermoplastic polymer having among other physical properties medium to high impact strength. Thus, the latching fingers 112 are flexible, yet resilient for a secure snap-fit engagement. In this connection, each of the latching fingers 112 can move from an initial unflexed and unlocking condition (FIGS. 3 and 5) to a flexed and locking condition (FIGS. 4 and 6).

To effect assembly of the housing 64 and, in particular, the snap-fit engagement of the latching fingers 112 to the latching detent 94, the locking ledges 86 initially slidably cooperate with the hooking portions 106, as in the fashion depicted in FIG. 5, and the forward portions of the upper and lower housing components 66 and 68 are pivoted together. To facilitate this pivoting type assembly as well as optimize spacing available for electric components, the latching fingers 112 and the latching detents 94 are formed on and adjacent the forward-most portion of the end walls 100. During such pivoting movement, the flexible latching fingers 112 engages the respective camming surfaces 95 and are flexed away from the end walls 110 until the windows 116 can cooperate and receive the detent 94 including the latching shoulder 96. This action is brought about by the inherent resiliency of the latching fingers 112 causing them to snap back into engagement with the locking wall portion 92 as shown in FIGS. 4 and 6.

As so engaged, a user is prevented from vertically separating the housing components 66 and 68 by manually pulling them apart in a vertical direction generally parallel to the plane of the wall 100. This is because of the interference arising from the contact between the latching shoulder 96 and the bottom wall section defining the window 116. Likewise separation of the housing components 66 and 68 in an opposite horizontal direction, as best viewed in FIG. 4, is prevented because of the vertical side wall sections defining the window 116 straddle and are engageable with the latching portion 94 when pulled in either of the horizontal directions.

Since the latching fingers 112 overlap or extend behind the latching detents 94 and are integrally connected to the end wall 100 so as to move therewith, it will be appreciated that each of the latching fingers will prevent the end wall from moving laterally outwardly or at an angle to a given plane of the end wall 100. Accordingly, the latching fingers 112 will not be disengaged by pulling or prying action applied at an angle to the end wall 100. Also, the noted vertical separation is continuously prevented as well as separation of the housing components in opposed horizontal directions.

It will be further appreciated that the latching window 116 and the latching detent 94 can be reversed. In other words, the latching wall 92 could be provided with the window 116 and the latching finger 112 could be provided with a latching detent 94 arranged to cooperate so as it can releasably engage the window. Also, other structure equivalent to a window and latching detent could be provided consistent with the present invention.

According to the above described arrangement, the flash housing 64 is tamper resistant to unassisted manual handling of the type wherein the end wall 100 is moved generally laterally or at an angle to the plane of the end wall. Advantageously, the improved flash housing 64 significantly diminishes the likelihood of a user opening the housing and thus being subjected to electrical shock by the electrically powered components. While this structural arrangement inhibits such separation, separation can nevertheless be effected by, for example, means of a suitable elongated tool (not shown). Separation could occur by allowing insertion of a thin tool through the opening 98 and into engagement with the latching finger 112 with enough force to independently flex the latching finger and thereby overcome its inherent biasing force to effect the desired disengagement from the latching detent 94.

From the foregoing detailed description, the construction and operation of the improved flash housing 64 and particularly the latching arrangement of the present invention should be understood. Although the above description is related to strobe housings, it is to be understood, of course, that the spirit and scope of this invention embrace other types of snap-fit housings.

Thus, it will be appreciated that as a result of this invention, an improved housing is provided by which the above-mentioned objectives are completely fulfilled. Also, it will be apparent to those skilled in the art that modifications and/or changes may be made in the illustrated embodiment without departure from inventive concepts manifested thereby. Accordingly, it is expressly intended that the foregoing description is of a preferred embodiment only, not limiting, and that the true spirit and scope of the present invention be determined by reference to the appended claims.

We claim:

1. In a housing for retaining electronic elements of a photographic flash unit, said housing comprising mating first and second housing sections held in an assembled condition by complementary structure for latching said first section to said second, said complementary structure comprising a first latching arrangement carried on the interior of an exterior wall of said first section, and a second latching arrangement, crried by said second section in position to engage said first latching arrangement when said components are mated to thereby prohibit separation of the housing sections when the housing sections are pulled in opposite directions in a given plane generally parallel to the plane of said exterior wall, the improvement wherein:

said first latching arrangement includes a member extending from the interior of said wall with a portion of the member in overlapping relationship and interiorly of said second latching arrangement, and said second latching arrangement being adapted to engage said overlapping portion in a latching arrangement whereby said second latching arrangement is retained in continuous engagement with said overlapping portion when said wall is pulled in opposite directions relative to the first latching arrangement at an angle to the given plane.

2. The housing of claim 1 wherein said second latching arrangement includes a projection extending interiorly of said wall so as to engage said overlapping portion of said first latching arrangement.

3. In a housing for retaining electric and electronic elements of a photographic flash unit comprising mating first and second housing components; a locking detent carried from an interior surface of an exterior wall of the first housing component; a latching finger carried by the second housing component and having means for releasably engaging the latching finger, the improvement wherein:

the latching finger has a portion made of material flexible relative to the locking detent for facilitating releasable engagement therebetween as the first and second housing components are forced together, the locking detent having a camming surface configured and dimensioned to engge the flexible finger portion and cooperate with it in such a fashion during assembly of the housing components to flex the finger from an unlocking condition, wherein the detent and releasable means are out of engagement, to a locking condition, wherein the releasable engaging means lockingly cooperates with the detent to thereby prohibit separation of the housing components when the housing components are pulled in opposite directions in a given plane generally parallel to the plane of said finger, said latching finger extends from said second component in overlapping relationship to a surface of the locking detent facing away from said interior surface of the wall so that the releasable engaging means releasably engages and retains the latching finger in continuous engagement with the locking detent when said interior wall is pulled in opposite directions relative to the first housing component at an angle to said given plane.

* * * * *